US009900437B2

(12) United States Patent
Ristock et al.

(10) Patent No.: US 9,900,437 B2
(45) Date of Patent: *Feb. 20, 2018

(54) CUSTOMER CONTROLLED INTERACTION MANAGEMENT

(71) Applicant: GENESYS TELECOMMUNICATIONS LABORATORIES, INC., Daly City, CA (US)

(72) Inventors: Herbert W. A. Ristock, Walnut Creek, CA (US); Merijn te Booij, Burlingame, CA (US); Akbar Riahi, El Sobrante, CA (US); Vladimir Mezhibovsky, San Francisco, CA (US); Kentis Gopalla, Burlingame, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/594,211

(22) Filed: May 12, 2017

(65) Prior Publication Data
US 2017/0251107 A1 Aug. 31, 2017

Related U.S. Application Data

(63) Continuation of application No. 14/470,898, filed on Aug. 27, 2014, now Pat. No. 9,654,637.

(51) Int. Cl.
H04M 3/51 (2006.01)
H04M 3/523 (2006.01)
H04M 3/42 (2006.01)

(52) U.S. Cl.
CPC ..... *H04M 3/5235* (2013.01); *H04M 3/42068* (2013.01); *H04M 3/5166* (2013.01);
(Continued)

(58) Field of Classification Search
CPC ...... H04M 3/51; H04M 3/5183; H04M 3/523; H04M 3/5232; H04M 3/5235;
(Continued)

(56) References Cited

U.S. PATENT DOCUMENTS 6,064,730 A 5/2000 Ginsberg
6,272,216 B1 8/2001 Vaios
(Continued)

FOREIGN PATENT DOCUMENTS

WO 9900966 A1 1/1999
WO 0308144 A1 10/2003

OTHER PUBLICATIONS

International Search Report and Written Opinion for International Application No. PCT/US2015/047271, dated Dec. 3, 2015, 16 pages.
(Continued)

*Primary Examiner* — Harry S Hong
(74) *Attorney, Agent, or Firm* — Lewis Roca Rothgerber Christie LLP

(57) ABSTRACT

A system and method for managing interactions of a customer contact center. A contact center processor receives a request to reserve a contact center resource for handling an interaction. The processor also receives data about the interaction. The processor identifies a routing point for routing the interaction based on the received data. The routing point is associated with routing logic controlled by a customer instead of the contact center. The processor routes the interaction to the identified routing point for giving the customer control of the routing of the interaction.

20 Claims, 14 Drawing Sheets

(52) U.S. Cl.
CPC ....... *H04M 3/5175* (2013.01); *H04M 3/5191* (2013.01); *H04M 2203/2011* (2013.01); *H04M 2203/401* (2013.01)

(58) Field of Classification Search
CPC ......... H04M 2203/408; H04M 3/5175; H04M 3/5166; H04M 3/5191; H04M 3/42068; H04M 2203/2011; H04M 2203/401
USPC .......................... 379/265.01, 265.02, 265.09, 379/265.11–265.14, 266.1
See application file for complete search history.

(56) References Cited

U.S. PATENT DOCUMENTS

| | | | |
|---|---|---|---|
| 9,654,637 | B2 * | 5/2017 | Ristock ............... H04M 3/5232 |
| 2002/0196926 | A1 | 12/2002 | Johnson et al. |
| 2006/0123060 | A1 | 6/2006 | Allen et al. |
| 2007/0160054 | A1 | 7/2007 | Shaffer et al. |
| 2007/0206584 | A1 | 9/2007 | Fulling et al. |
| 2010/0080378 | A1 | 4/2010 | Katz |
| 2010/0278318 | A1 | 11/2010 | Flockhart et al. |
| 2012/0224681 | A1 | 9/2012 | Desai et al. |
| 2013/0132293 | A1 | 5/2013 | Sterczyk et al. |
| 2013/0173687 | A1 | 7/2013 | Tuchman et al. |
| 2013/0198039 | A1 | 8/2013 | Sridharan et al. |
| 2014/0044250 | A1 | 2/2014 | Gartner et al. |
| 2014/0100902 | A1 | 4/2014 | Godfrey et al. |
| 2014/0126713 | A1 | 5/2014 | Ristock et al. |
| 2014/0161241 | A1 | 6/2014 | Baranovsky et al. |
| 2014/0162611 | A1 | 6/2014 | Mezhibovsky et al. |
| 2014/0164257 | A1 | 6/2014 | Brown |
| 2014/0171034 | A1 | 6/2014 | Aleksin et al. |
| 2014/0245143 | A1 | 8/2014 | Saint-Marc |
| 2014/0321634 | A1 | 10/2014 | Baranovsky et al. |
| 2016/0065740 | A1 | 3/2016 | Ristock et al. |
| 2016/0065741 | A1 | 3/2016 | Mezhibovsky et al. |

OTHER PUBLICATIONS

European Patent Office Partial Supplementary Search Report for Application No. 15836852.2, dated Jul. 20, 2017, 11 pages.
Extended European Search Report for Application No. 15835852.2, dated Oct. 30, 2017, 10 pages.

* cited by examiner

CUSTOMER CONTROLLED INTERACTION MANAGEMENT

CROSS-REFERENCE TO RELATED APPLICATION

This application is a continuation of U.S. patent application Ser. No. 14/470,898, filed on Aug. 27, 2014, now U.S. Pat. No. 9,654,637, which is related to U.S. patent application Ser. No. 14/470,913, filed on Aug. 27, 2014, the content of all of which are incorporated herein by reference.

BACKGROUND

Typical processing of interactions between a customer and a contact center are generally under the control of the contact center. For example, the contact center generally selects the agent to which an inbound/outbound interaction from/to a customer is to be routed. Although contact centers do employ certain business driven customization and personalization, such customization and personalization generally sides with the interests of the business.

There are some instances where the customer has access to a direct phone line of the customer's preferred agent and may therefore be in control of the agent with whom the customer ultimately interacts. However, even in this scenario, the customer runs the risk of dialing "blindly" without knowledge of the availability of the agent to answer the call.

Accordingly, what is need is a system and method for providing a customer at least partial control of interactions with a contact center.

SUMMARY

Embodiments of the present invention are directed to system and method for managing interactions of a customer contact center. The system includes a processor and a memory. The memory has stored therein instructions that, when executed by the processor, cause the processor to execute the following acts. The processor receives a request to reserve a contact center resource for handling an interaction. The processor also receives data about the interaction. The processor identifies a routing point for routing the interaction based on the received data. The routing point is associated with routing logic controlled by a customer instead of the contact center. The processor routes the interaction to the identified routing point for giving the customer control of the routing of the interaction.

According to one embodiment, the interaction is a telephony interaction, and the system includes a switch that is coupled to the processor for establishing a voice path between the end user device and a device of the contact center resource.

According to one embodiment, the received data includes a caller identifier.

According to one embodiment, the processor transmits a software application to the customer end user device over a communications network, where the software application includes instructions for executing the routing logic.

According to one embodiment, the software application monitors presence of the contact center resource.

According to one embodiment, the software application includes instructions for receiving the presence information from a contact center server.

According to one embodiment, the software application is transmitted to the customer end user device in response to identifying the customer as belonging to a particular customer segment.

According to one embodiment, the interaction is a telephony interaction, and the software application invokes a dialer for initiating the telephony interaction.

According to one embodiment, the software application provides an interface for prompting the customer to configure the routing logic.

According to one embodiment, the software application provides an interface for prompting the customer to identify one or more preferred contact center agents.

According to one embodiment, the software application provides an interface for prompting the customer to rate the interaction.

According to one embodiment, the software application is configured to share the rating with other customers.

According to one embodiment, the routing point is identified by a telephone number.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

In general terms, embodiments of the present invention are directed to a system and method for customer controlled interaction management (CCIM) where a customer is given control of interactions with a contact center where such control would typically reside with the contact center. According to one embodiment, the control exercised by the customer is the routing of interactions to contact center resources (e.g. agents). In giving a customer CCIM for an interaction, the contact center exposes real-time status information of certain resources of the contact center, such as, for example, presence information of certain agents of the contact center. Based on this information, the customer dictates when to initiate the interaction, and the selection of the agent to whom the interaction is to be routed. In this regard, the traditional role of the contact center (business) and the customer are reversed. Instead of the contact center acting in the best interest of the contact center, the customer controls interactions according to his best interest.

According to one embodiment, CCIM eligibility may be given for certain types of customers, such as, for example, customers deemed to be important to the contact center. For example, CCIM eligibility may be given to customers in certain customer segments (e.g. customers labeled as "Gold" customers). In some embodiments, CCIM eligibility may be provided as compensation for bad customer service experience. Also, in some embodiments, CCIM eligibility may be revoked by the contact center.

By enabling CCIM for "Gold" customers, the need for agent reservation for such customers is reduced if not eliminated. CCIM may allow such a "Gold" customer to experience the same or even better customer experience than what would be achieved by having dedicated, reserved agents for such customers, while at the same time, avoiding the risk of such reserved agents sitting idle when there is traffic overload for other agents. CCIM also allows the reduction or avoidance of call parking (queuing) at the business by establishing the call only when the desired agent is actually available. If there is some waiting involved for a CCIM session, it may not count towards meeting the business' service level, allowing service compliance for CCIM sessions to be relaxed.

Figure 1:
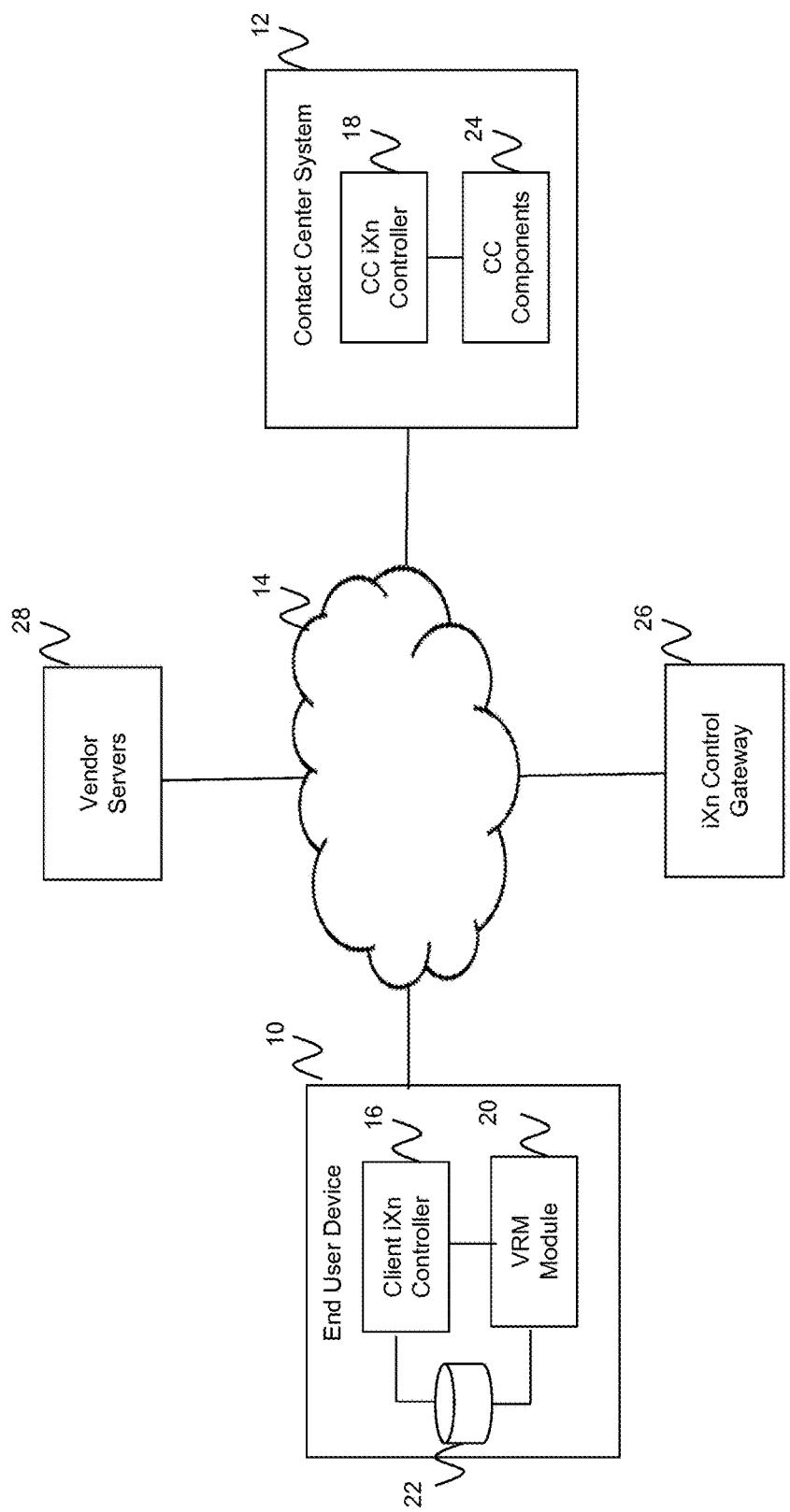
FIG. 1 is a schematic block diagram of a generalized system for customer controlled interaction management according to one embodiment of the invention.

FIG. 1 is a schematic block diagram of a generalized system for customer controlled interaction management according to one embodiment of the invention. The system includes an end user device 10 coupled to a contact center system 12 over a communications network 14 conventional in the art. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, or any wireless network/technology conventional in the art, including but to limited to 3G, 4G, LTE, and the like.

According to one embodiment, the end user device 10 may be a communication device conventional in the art, such as, for example, a smart phone, laptop, desktop, electronic tablet, and/or the like. A customer operating the end user device 10 may initiate, manage, and respond to telephone calls, emails, chats, text messaging, web-browsing sessions, and other multi-media transactions via the end user device.

According to one embodiment, the end user device includes a client interaction (iXn) controller 16, vendor relationship management (VRM) module 20, and data storage device 22. The client iXn controller 16 may be configured with logic to initiate interactions, and manage, control and/or assist a customer in the CCIM of those interactions. The client iXn controller 16 may further be configured to communicate with the contact center system (including the associated business and/or vendor) to exchange data to enable/facilitate the CCIM. Exemplary data that may be exchanged is presence data of agents at the contact center.

According to one embodiment, the client iXn controller 16 is also equipped with capability (e.g. a tool or application) to develop control logic for CCIM at the customer side. The control logic may include a customized routing logic. The client iXn controller 16 may also be equipped for customer side case management, knowledge management, recording, and/or reporting.

In an exemplary use case, a customer that is identified as being appropriate for CCIM capability may be offered to download an application hosting the client iXn controller 16 and/or VRM module 20 on the end user device. According to one embodiment, the customer may be logged into the business' web site. The web site may recognize the customer as being a "Gold" customer, and display a prompt saying to "click here" if he wants to download the app. The customer may also be identified as a "Gold" customer during a current interaction with a contact center agent. The agent may ask the customer if the wants to download the app. If the answer is YES, the agent may send a link to the customer's end user device (e.g. as a text message, email, or the like) that the user may select to perform the download.

The application may be downloaded from an app store, from a website of the business, and/or the like. Once installed, the customer may be prompted to configure specific CCIM details such as, for example, a communication protocol to use in the event that multiple protocols are available. According to one embodiment, an available protocol for selection may be a session-initiation protocol (SIP) conventional in the art. Other parameters to be configured may include, for example, data (e.g. information on the customer's preferred agents) that is to be shared between the end user device and the contact center system, interaction recording options, reporting options, and the like.

According to one embodiment, the customer may be prompted to identify agents that the customer wants to monitor for presence, and/or customers that the customer wants to add to his preferred agent list. In this regard, the customer may be provided with a complete list of agents for the business. The list of agents may be categorized, for example, based on skills, departments, and the like. According to one embodiment, instead of monitoring presence of individual agents, the customer may select to monitor presence of an agent group. In this regard, if any member of the group is available, the group is identified as being available.

According to one embodiment, the customer may be further prompted to generate a personalized routing script for routing interactions for the customer. Templates may be provided to the customer for guiding the customer in setting up the routing script. Default routing scripts may also be provided to the customer if he does not want to set up a personalized one.

The routing script generated for the customer may be configured to replace or plug-into the routing script utilized by the contact center. The routing script may also control timing of the interaction, target selection (e.g. specific agents, interaction voice response applications, etc.), and the like. For example, the routing script may be configured to identify an agent or agent group to which to route an interaction. According to one embodiment, the customer's personal routing script may be configured to prompt or await specific selection of the agent or agent group by the customer prior to the routing of the interaction.

In some embodiments, the routing script may automatically select a preferred agent for a particular interaction. In this regard, the routing logic may be configured to connect to the mass storage device 22 to identify ratings of agents (e.g. by the customer, other customers, and the like), and select an agent identified to have, for example, the highest rating. The rating of agents may be adjusted based on past interaction information provided by the customer or other third parties.

In addition to routing scripts, the client iXn controller 16 may also provide a tool to develop, manage, and utilize (load) other types of scripts. For example, dialogue scripts may be generated for guiding the customer during a live conversation with the contact center. The dialogue script may automate certain steps of the conversation, such as, for example, passing personal information about the customer, greetings, and the like. Scripts may also be generated for granting to the enterprise filtered access to the customer's CCIM data.

According to one embodiment, the VRM module 20 includes logic for allowing the customer to not only be in control of customer interactions, but also be in control of data exchanged between the customer and different enterprises (vendors), referred to as vendor relationship management (VRM). In this regard, the VRM module 20 is configured to communicate with one or more vendor systems 28 associated with one or more businesses, such as, for example, the business for which contact center services are provided via the contact center system 12, to exchange relevant data according to rules set up by the customer. According to one embodiment, the term vendor is also intended to encompass the contact center system for which contact center services are provided.

According to one embodiment, the VRM module 20 provides a tool to allow the customer to control what kind of data to share, when to share, and with which businesses to share. The tool may further allow the customer to control the type and timing of data that is received from the various vendors with which the customer has a relationship, as is described in further detail in U.S. application Ser. No. 14/201,738, filed on Mar. 7, 2014, the content of which is incorporated herein by reference. For example, the customer may expose, via the VRM module 20, customer account information that will be needed to communicate with certain vendors. The vendors in turn may expose their availability information, such as their business hours of the contact center system 12, certain tips on communicating with the vendors, and the like.

Part of VRM may include maintaining track of interactions with the vendors, including, for example, interactions controlled by the customer via the client iXn controller, and other interactions not controlled by the customer if CCIM is not provided for those interactions. In addition, the VRM module may allow the user to maintain personal notes or scores relating to the vendors and individual interactions with such vendors. For example, the customer may provide a scoring of service quality and of individual agents. The customer may also keep notes on how to communicate best with a particular company (e.g. best media type, best timing, how to fast-track IVR menu, and other do's and don'ts), learned from past experience or from data shared by other customers, such as, for example, via social media. Some of the information may be fed by the vendors themselves. This information may be accessed by the client iXn controller for initiating an interaction with the vendor, or during a CCIM session to allow the interaction to progress more efficiently.

The client iXn controller 16 and VRM module 20 are coupled to the mass storage device 22 which may take the form of a disk drive or drive array conventional in the art. The mass storage device 22 may store different types of records, such as, for example, interactions records, vendor records, configuration data, scripts, and the like. The vendor records may include VRM details of different vendors with which the customer has relations. For example the vendor records may include, without limitation, vendor metadata (e.g. contact numbers/addresses, office hours, type of business, and types of offered services), vendor profile or classification (e.g. values reflective of the vendor's speed in providing committed service, ease of doing business with the vendor, and corporate assessment data (e.g. risk of bankruptcy)), assessment of agents with whom the customer has had interaction (e.g. satisfaction scores, and preference indicators), schedules of preferred agents, and offered communication channels along with the customer's preference indicators for each offered channel. Each vendor record may also include data on how to improve the customer's interaction experience with the vendor such as, for example, "tricks" to fast-track IVR dialogue (e.g. a series of numbers to press to reach certain departments), data that is to be exposed (or not) to the vendor (e.g. last 4 digits of the customer's social security number which is a question that is always asked during an IVR dialogue with the vendor), and other data exposed by the vendor or collected from data shared by other customers.

According to one embodiment, the interaction records maintained in the mass storage device include, without limitation, interaction metadata (e.g. time, parties, and service type), case reference where each case may include multiple individual interactions (e.g. a case reference may be provided to process an accident claim), business outcome (e.g. sales, or credit card offer accepted), status of interaction (e.g. case closed, finished, or not finished), and customer's annotations (e.g. satisfaction ratings or things learned from the experience).

Portions of the data stored in the mass storage device 22 may be shared with the vendor servers 28, contact center system 12, and/or other customers according to set rules. For example, agent satisfaction scores may be posted onto one or more social media website according to the rules. The data may also be updated from these entities according to set rules.

Although throughout this discussion, the client iXn controller 16 and VRM module 20 are assumed to be separate functional units, a person of skill in the art should recognize that the functionality of these units may be combined or integrated into a single component, or further subdivided into further sub-units without departing from the spirit of the invention. According to one embodiment, the client iXn controller 16 and VRM module 20 are locally hosted by the end user device as, for example, a local application. In other embodiments, the controller and module may be hosted in a third party system and accessed in real-time by the end user device as a service (e.g. over the web) during an actual CCIM session. In yet other embodiments, a hybrid solution may be provided where the processing logic resides at the end-user device, but the data stored in the storage device 22 is maintained in a remote computing environment such as, for example a cloud computing environment.

Referring now to the contact center system 12, the contact center system includes a contact center (CC) iXn controller 18 providing logic for the business-side CCIM. In this regard, the CC iXn controller 18 communicates with the client iXn controller for enabling CCIM of interactions by the customer. For example, messages may be exchanged to expose agent presence information to the end user device. The messages may also be for giving control to the client iXn controller 16 for routing an interaction initiated by the customer. In exchanging such messages with the end user device 10, the CC iXn controller 18 further communicates with traditional CC components 24 as described in further detail below.

The contact center system may be deployed in equipment of the corresponding enterprise, a third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one embodiment, an iXn control gateway 26 may be optionally coupled in-between the end user device 10 and contact center system 12. The iXn control gateway 26 may expose an application programming interface (API) and/or protocols for allowing the client iXn controller 16 to exchange messages with the CC iXn controller 18.

According to one embodiment, a single iXn control gateway 26 may be provided for different contact center systems. The functionality of the client iXn controller 16 and/or CC iXn controller 18 may reside in the iXn control gateway 26. The functionality may be accessed by both customers and businesses as a service, such as, for example, software-as-a service (SaaS), as a managed service, or the like. Both customers and businesses may subscribe to this service. During an actual CCIM session, data exchanged via the media and control channels may flow through the iXn control gateway 26, or the session may be conducted directly between the end user device 10 and contact center system 12 in a peer-to-peer fashion.

In embodiments where CCIM is not provided as a service, but is fully owned and operated by the customer (e.g. CCIM application running on the customer's mobile device), and all business side CCIM is owned and operated by the business directly, there may be no need for the iXn control gateway 26. In this embodiment, the CCIM communications between the end user device 10 and contact center system 12 may be peer-to-peer. Certain components of the contact center, such as, for example, a contact center router, may also act as the iXn control gateway 26.

Figure 2:
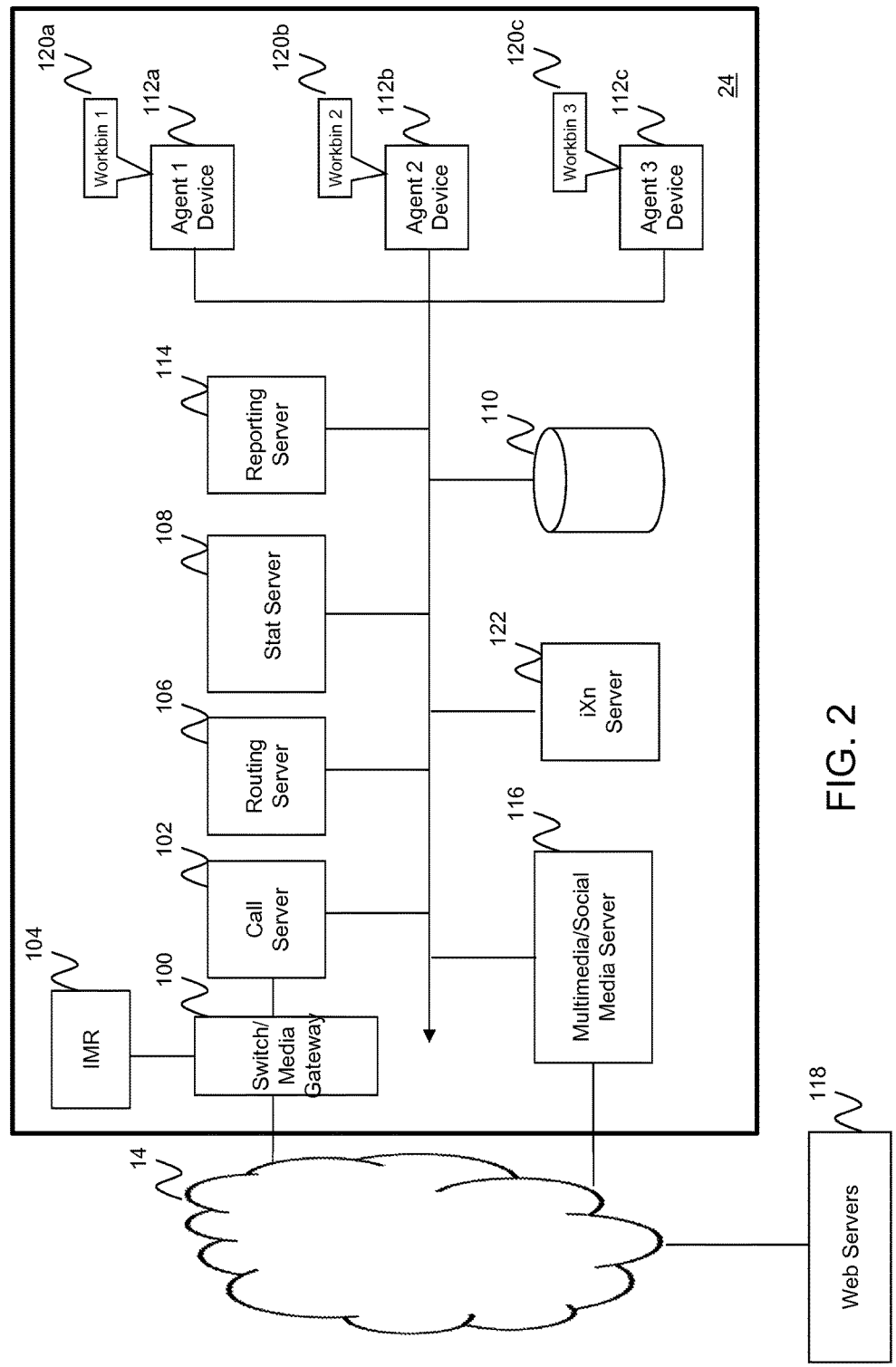
FIG. 2 is a more detailed block diagram of the contact center components according to one exemplary embodiment of the invention.

FIG. 2 is a more detailed block diagram of the contact center components 24 according to one exemplary embodiment of the invention. According to one exemplary embodiment, the contact center system includes a switch/media gateway 100 coupled to the communications network 14 for receiving and transmitting calls between the customers and the contact center. The switch/media gateway 100 may include a telephony switch configured to function as a central switch for agent level routing within the center. In this regard, the switch 100 may include an automatic call distributor, a private branch exchange (PBX), an IP-based software switch, and/or any other switch configured to receive Internet-sourced calls and/or telephone network-sourced calls from a customer, and route those calls to, for example, an agent telephony device. In this example, the switch/media gateway establishes a voice path (not shown) between the calling customer and, for example, the agent telephony device.

According to one exemplary embodiment of the invention, the switch is coupled to a call server 102 which may, for example, serve as an adapter or interface between the switch and the remainder of the routing, monitoring, and other call-handling components of the contact center.

The call server 102 may be configured to process PSTN calls, VoIP calls, and the like. For example, the call server 102 may include a session initiation protocol (SIP) server for processing SIP calls. According to some exemplary embodiments, the call server 102 may, for example, extract data about the customer interaction such as the caller's telephone number, often known as the automatic number identification (ANI) number, or the customer's internet protocol (IP) address, or email address, and communicate with other CC components and/or CC iXn controller 18 in processing the call.

According to one exemplary embodiment of the invention, the contact center system 24 further includes an interactive media response (IMR) server 104, which may also be referred to as a self-help system, virtual assistant, or the like. The IMR server 104 may be similar to an interactive voice response (IVR) server, except that the IMR server is not restricted to voice, but may cover a variety of media channels including voice. Taking voice as an example, however, the IMR server may be configured with an IMR script for querying calling customers on their needs. For example, a contact center for a bank may tell callers, via the IMR script, to "press 1" if they wish to get an account balance. If this is the case, through continued interaction with the IMR, customers may complete service without needing to speak with an agent. The IMR server 104 may also ask an open ended question such as, for example, "How can I help you?" and the customer may speak or otherwise enter a reason for contacting the contact center.

The routing server 106 may be configured to take appropriate action for processing the call. For example, for non-CCIM interactions, the routing server 106 may use data about the call to determine how the call should be routed. If the call is to be routed to a contact center agent, the routing server 106 may select an agent for routing the call based, for example, on a routing strategy employed by the routing server 106, and further based on information about agent availability, skills, and other routing parameters provided, for example, by a statistics server 108. For CCIM interactions, the routing server 106 may pass control of the routing to the client iXn controller 16, or receive instructions from the client iXn controller to route the call.

In some embodiments, the routing server 106 may query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, and SQLite, and may be stored in a mass storage device 110. The routing server 106 may query the customer information from the customer database via an ANI or any other information collected by the IMR 104.

According to one embodiment the statistics server 108 or a separate present server may be configured to provide agent availability information to all subscribing clients. Such clients may include, for example, the routing server 106, CC iXn controller 18, and/or client iXn controller 16.

Upon identification of an agent to whom to route the call, a connection is made between the caller and an agent device 112a-112c (collectively referenced as 112) of the identified agent. Received information about the caller and/or the caller's historical information may also be provided to the agent device for aiding the agent in better servicing the call. In this regard, each agent device 112 may include a telephone adapted for regular telephone calls, VoIP calls, and the like. The agent device 112 may also include a computer for communicating with one or more servers of the contact center and performing data processing associated with contact center operations, and for interfacing with customers via voice and other multimedia communication mechanisms.

The contact center may also include a reporting server 114 configured to generate reports from data aggregated by the statistics server 108. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

The contact center may also include a multimedia/social media server 116 for engaging in media interactions other than voice interactions with the end user devices 10 and/or web servers 118. The media interactions may be related, for example, to email, vmail (voice mail through email), chat, video, text-messaging, web, social media, co-browsing, and the like. The web servers 118 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an iXn server 122 interacts with the routing server 106 for selecting an appropriate agent to handle the activity. Once assigned to an agent, the activity may be pushed to the agent, or may appear in the agent's workbin 120a-120c (collectively referenced as 120) as a task to be completed by the agent. The agent's workbin may be implemented via any data structure conventional in the art, such as, for example, a linked list, array, and/or the like. The workbin may be maintained, for example, in buffer memory of each agent device 112. According to one embodiment deferrable interactions may also be subject to CCIM.

According to one exemplary embodiment of the invention, the mass storage device(s) 110 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 110 or elsewhere. The mass storage device may take form of a hard disk or disk array as is conventional in the art.

The contact center may also include a reporting server 114 configured to generate reports from data aggregated by the statistics server 108. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

The various servers of FIG. 2 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention. In addition, the functionality the functionality of the CC iXn controller 18 may be incorporated into one or more of the CC components 24 or vice versa as will be apparent to a person of skill in the art.

In the various embodiments, the term interaction is used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Figure 3:
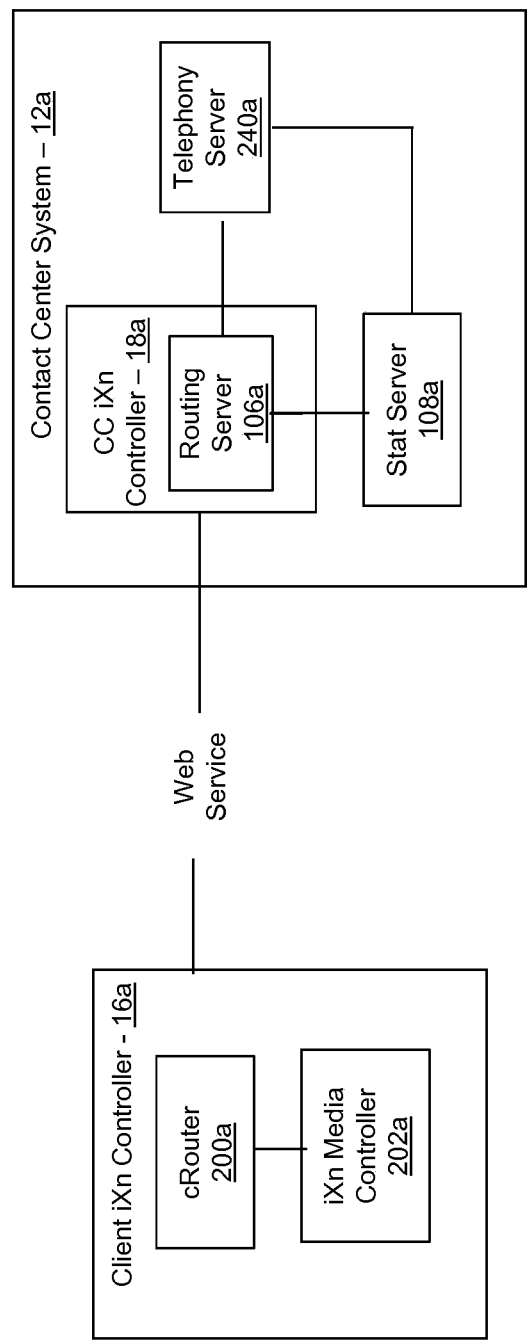
FIG. 3 is a more detailed block diagram of a client iXn controller and a contact center (CC) iXn controller according to one embodiment of the invention.

FIG. 3 is a more detailed block diagram of a client iXn controller 16a and a CC iXn controller 18a according to one embodiment of the invention. Like reference number in this and other figures of the application reference like components. For example, client iXn controller 16a may be similar to client iXn controller 16, and CC iXn controller 18a may be similar to CC iXn controller 18. In the embodiment of FIG. 3, the CC iXn controller 18a provides CCIM capability to the client iXn controller 16a as a web service over the communications network 14. Any web protocol conventional in the art may be used for the web communication, such as, for example, SOAP and/or HTTP.

The CC iXn controller 18a may include a routing server 106a which may be similar to the routing server 106 of FIG. 2. The CC routing server 106a is coupled to a CC statistics server 108a and a CC telephony server 240a which may be similar to the statistics server 108 and call server 240 of FIG. 2.

According to one embodiment, the client iXn controller 16a includes a client router 200a and client iXn media controller 202. The client router 200a may be configured as a "lite" version of the CC routing server 106a, and the client iXn media controller 202 may be configured as a "lite" version of the CC telephony server 240a. In this regard, the client router 200a and iXn media controller 202a provide functionality similar to the basic functionality provided respectively by the CC routing server 106a and telephony server 240a.

According to one embodiment, the client iXn controller 16a may be configured to monitor the presence of monitored agents (e.g. agents in a customer's preferred agent list). This may be done, for example, by the client router 200a requesting status of one or more of the monitored agents, either periodically or on an as-needed basis. The CC iXn controller 18a receives the request, and invokes the CC routing server 106a to in turn query the statistics server 108a for status information of the one or more agents. The agent status information for a particular agent may indicate, for example, whether the agent is available, the communication medium for which the agent is agent, and the like. The retrieved agent status information is forwarded to the client router 200a over the communication network 14.

According to one embodiment, the routing logic for routing interactions involving the customer resides in the client iXn controller. In this regard, the client router 200a and/or iXn media controller 202a communicates with the CC routing server 106a to request that an interaction be routed to an agent or agent group as instructed by the customer's routing logic. Such agent may be selected automatically by the customer's routing logic based on, for example, agents that have been identified by the customer as being preferred, and current availability of such agents. The routing request may include data of the requesting user (e.g. a customer phone number), and identification of the desired agent or agent group. The CC routing server 106a then interacts with the CC telephony server 240a to cause the interaction to be routed to the agent device of the selected agent.

Figure 4:
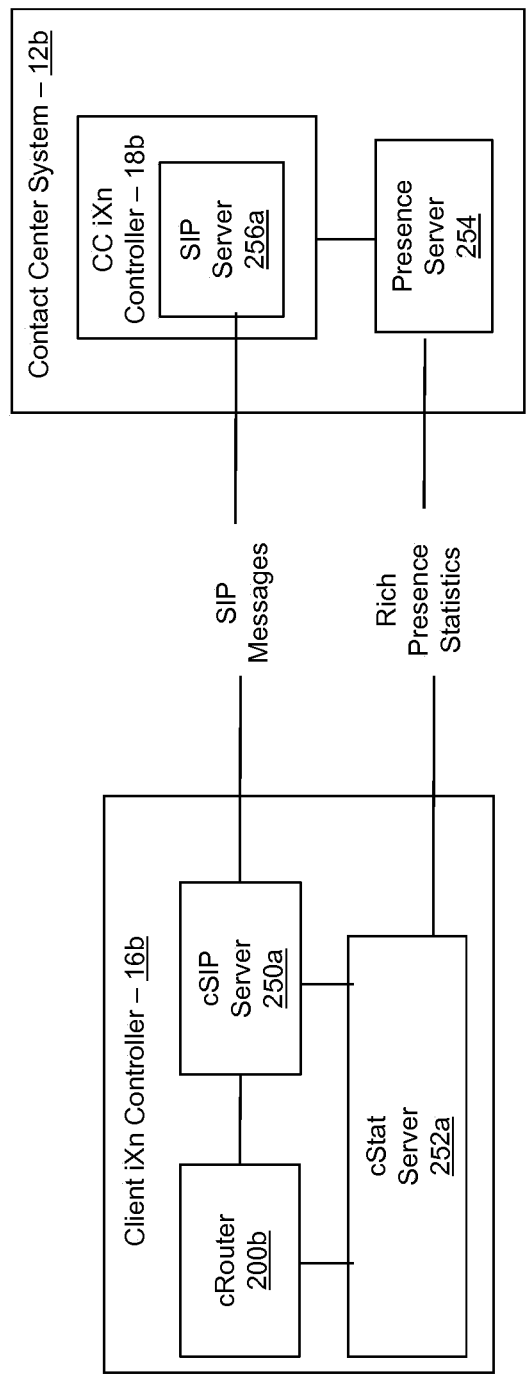
FIG. 4 is a more detailed block diagram of a client iXn controller and a CC iXn controller according to another embodiment of the invention.

FIG. 4 is a more detailed block diagram of a client iXn controller 16b and a CC iXn controller 18b according to one embodiment of the invention. In the embodiment of FIG. 4, SIP is used for exchanging interaction data between the client iXn controller 16b and CC iXn controller 18b. In this regard, the CC iXn controller includes a SIP server 256a which may be similar to the call server 102 of FIG. 2.

The client iXn controller 16b is equipped with a client router 200b, client SIP server 250a, and client statistics server 252a, which may be "lite" versions of respectively the routing server 106, CC SIP server 256a, and the contact center CC statistics server 108.

According to one embodiment, the client statistics server 252a may be configured to exchange messages with a contact center presence server 254 using SIMPLE (SIP for Instant Messaging and Presence Leveraging Extensions) to detect presence of desired agents. According to one embodiment, the contact center presence server may be in communication with, or incorporated into, the contact center statistics server, to provide status of the identified agents. Once received, the client statistics server 252a may expose the agent status data to the client router 200b for selecting an agent or agent group with which to communicate. The agent status data may also be provided for display by the CCIM application to allow a customer to manually select the agent with whom he wants to communicate.

According to one embodiment, the client router 200b invokes the client SIP server 250a to exchange SIP messages with the CC SIP server 256a to cause routing of an interaction from/to the end user device to a particular agent or agent group. Data about the end-user as well as the requested agent or agent group may be transmitted via the SIP messages. The CC SIP server 256a then interacts with one or more CC components to cause the interaction to be routed to the agent device of the selected agent.

Figure 5:
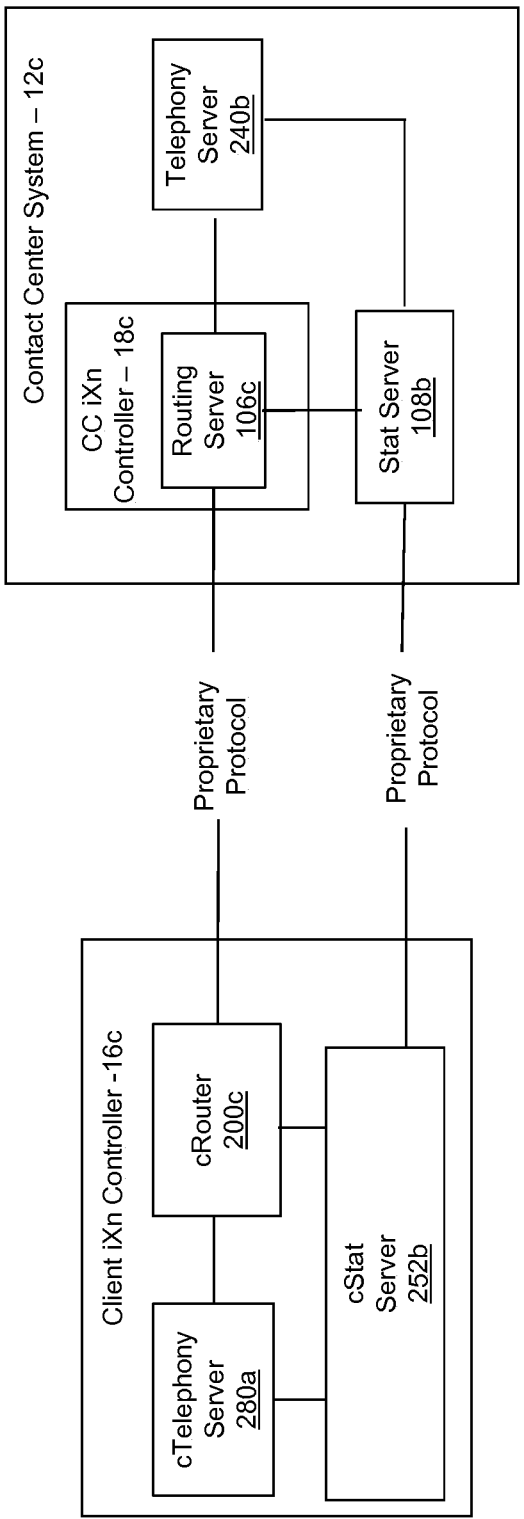
FIG. 5 is a more detailed block diagram of a client iXn controller and a CC iXn controller according to another embodiment of the invention.

FIG. 5 is a more detailed block diagram of a client iXn controller 16c and a CC iXn controller 18c according to one embodiment of the invention. In the embodiment of FIG. 5, a proprietary protocol is used for exchanging messages between the client iXn controller 16c and CC iXn controller 18c. In this regard, the CC iXn controller 18c includes a CC routing server 106c which may be similar to the routing server 106 of FIG. 2, for exchanging messages via the proprietary protocol. The contact center system 12c also includes a CC telephony server 240b and a CC statistics server 108b which may be similar, respectively, to the call server 102 and statistics server 108 of FIG. 2.

The client iXn controller 16c is equipped with a client router 200c, client telephony server 280a, and client statistics server 252b, which may be "lite" versions of respectively the CC routing server 106c, CC telephony server 240b, and CC statistics server 108b.

According to one embodiment, the client statistics server 252b may be configured to request and receive agent status information from the CC statistics server 108b using the proprietary protocol. In this regard, the client statistics server 252b subscribes to the CC statistics server 108b to receive agent status information as would any other client located at the contact center (e.g. the CC routing server 106c). Once subscribed, the client statistics server 252b exposes the agent status data to its subscribing clients, such as, for example, the client telephony server 208a and client router 200c.

According to one embodiment, the client telephony server 280a invokes the client router 200c to exchange messages with the CC routing server 106c to cause routing of an interaction to a particular agent or agent group. Data about the end-user as well as the requested agent or agent group may be transmitted via the proprietary protocol. The contact center telephony server 240b then allows the end user device to establish connection with the available agent device.

Figure 6:
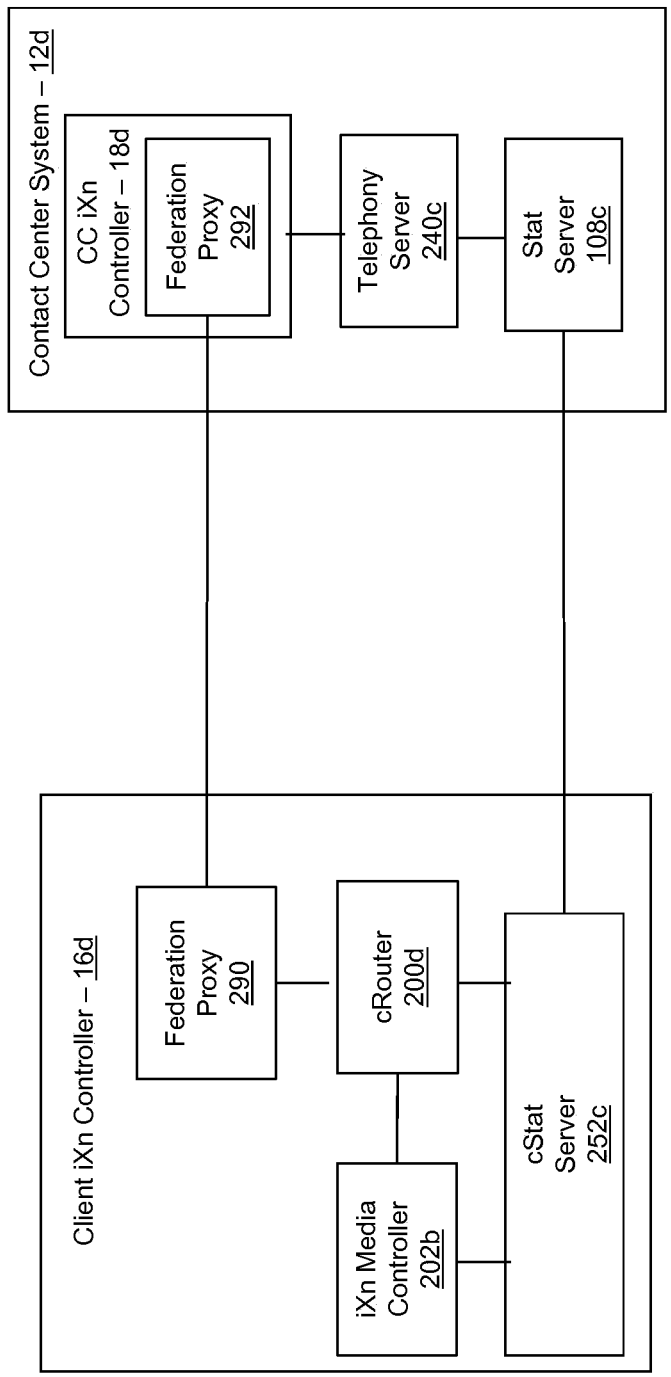
FIG. 6 is a more detailed block diagram of a client iXn controller and a CC iXn controller according to another embodiment of the invention.

FIG. 6 is a more detailed block diagram of a client iXn controller 16d and a CC iXn controller 18d according to one embodiment of the invention. In the embodiment of FIG. 6, federation principles are used for exchanging messages between the client iXn controller 16d and CC iXn controller 18d. In this regard, the CC iXn controller 18d includes a CC federation proxy 292 that acts as an intermediary for receiving interaction data from the client iXn controller 16d. As in a typical federated environment, the federation proxy 292 may be configured to authenticate requests from the client iXn controller and give access to certain services and data based on the authentication. The contact center system 12d also includes a CC telephony server 240c and a CC statistics server 108c which may be similar, respectively, to the call server 102 and statistics server 108 of FIG. 2.

According to one embodiment, the client iXn controller 16c is also equipped with a federation proxy 290 for transmitting interaction routing requests to the CC iXn controller 18d. The client iXn controller 16d may further include an iXn media controller 202b, client router 200d, and client statistics server 252c, which may be "lite" versions of respectively the CC telephony server 240c, routing server 106, and CC statistics server 108c.

According to one embodiment, the client statistics server 252c may be configured to request and receive agent status information from the CC statistics server 108c after the customer has been authenticated by the CC federation proxy 292. In this regard, the client statistics server 252c subscribes to the CC statistics server 108c to receive agent status information as would any other client located at the contact center (e.g. the CC telephony server 240c). Once subscribed, the client statistics server 252c exposes the agent status data to its subscribing clients, such as, for example, the iXn media controller 202b and client router 200d.

According to one embodiment, the iXn media controller 202b invokes the client router 200d to transmit requests to cause routing of an interaction to a particular agent or agent group. Data about the end-user as well as the requested agent or agent group may be transmitted in the request. According to one embodiment, the request is forwarded to the CC iXn controller 18d via the client federation proxy 290.

As a person of skill in the art should appreciate, for interactions other than voice interactions, the telephony/SIP servers at the customer and client side are replaced with a CC or client interaction server similar to the interaction server 122 of FIG. 2 which is configured to process non-voice interactions.

Figure 7:
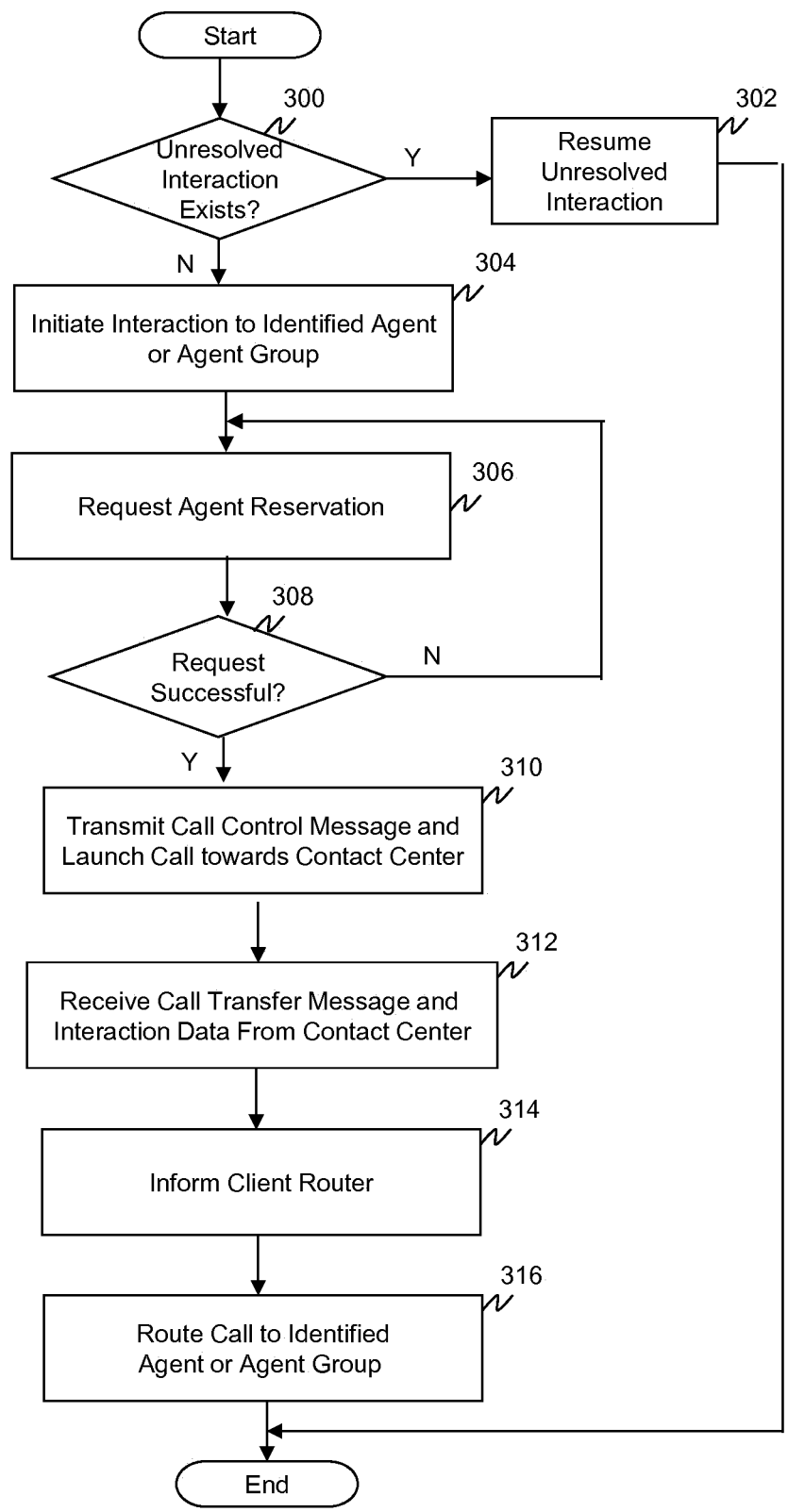
FIG. 7 is a flow diagram of a process executed by a client iXn controller to allow customer controlled interaction management for a customer according to one embodiment of the invention.

FIG. 7 is a flow diagram of a process executed by the client iXn controller 16 to allow CCIM for a customer according to one embodiment of the invention. The process may start in response to a customer invoking or launching the CCIM application hosting the client iXn controller 16. The application may be dedicated to a single business (e.g. Bank of America), a class of businesses (all banks used by the customer), and/or the like. The customer may launch the application to initiate contact with a particular business. According to one embodiment, in response to the customer invoking the application, the application determines, in act 300, whether any unresolved interactions exist for the customer. If the answer is YES, the unresolved interaction is resumed in act 302. For simplicity purposes, this step is generally identified as a single block 302. Of course, the resuming of the unresolved interaction may involve execution of one or more of the acts identified in FIG. 7.

According to one embodiment, determination as to whether an unresolved interaction exists is performed by searching the mass storage device 22 for interaction records stored for the customer that have been identified as being unresolved. Such records may further indicate the routing strategy that was invoked, and the portion of the routing strategy that was executed when the interaction was left uncompleted. The application may be configured to resume the interaction from this point on. For example, a next step in the routing strategy may be to select an agent with the right skills to handle the interaction.

The resumed interaction may utilize the same or different communication channels that were used during the last interaction. For example, the customer may have started a flight booking process on the web page of the business when the interaction was discontinued. The customer may be able to resume the interaction by invoking the application and placing a call to his preferred agent. Of course, the application may be configured to inquire whether the customer wants to resume this interaction before doing so.

If there are no unresolved interactions to be resumed, the application waits and detects a condition to initiate an interaction to an identified agent or agent group. The condition may be, for example, receipt of a customer command to initiate the interaction. For example, the application may provide a graphical user interface with availability/presence information of preferred agents and/or agent groups, along with an option to "call," "email," or "chat" with such agents. Selection of one of the interaction options initiates the corresponding interaction with the identified agent or agent group. The presence information may indicate whether the agent is busy with another interaction, not scheduled for work, and/or the like. According to one embodiment, the list of preferred agents and agent groups is configurable and modifiable by the customer at any time. For example, the graphical user interface may provide options to add, delete, or modify agents or agent groups from the customer's preferred list.

In one embodiment, detecting a particular event may automatically trigger the interaction, or display a question to the user as to whether he wants to initiate the interaction. The events may be, for example, detecting a particular time (e.g. if the user has set a timer to initiate the interaction), or detecting a monitored condition (e.g. if charge on a credit card was above a preset amount). In another example, even if the user manually indicates that he wants to initiate the interaction, the application may detect a conflict and either block the call, or display the conflict and ask the user to confirm that he wants to proceed with the interaction. For example, the application may have access to a preconfigured rule (e.g. set by the customer) that no calls are to be initiated when the customer is driving (e.g. when the bluetooth device in the car is active). In another example, the application may have access to the customer's calendar and detect that the customer is scheduled to have a meeting that would overlap with the interaction.

Figure 8:
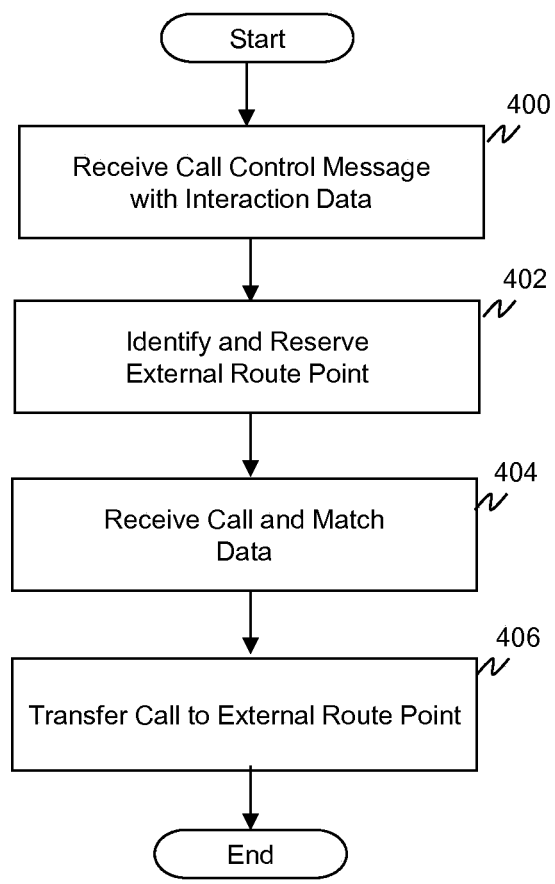
FIG. 8 is a flow diagram of a process executed by the CC iXn controller to allow customer controlled interaction management for a customer according to one embodiment of the invention.

For purposes of describing the embodiment of FIGS. 7 and 8, it is assumed that the customer has selected a telephony interaction by selecting the "call" option, and no conflicts have been detected to allow the interaction. According to one embodiment, although a specific agent or agent group is listed next to the call option, the number that is called may be a general telephone number of the contact center.

In another embodiment, the customer simply transmits a "call" command, and the routing logic at the customer end selects an agent according to, for example, preference settings, user ratings, and the like.

According to one embodiment, if the customer selects an agent whose status information indicates that he is not available to handle the call, the application may respond by asking the customer if he or she wants to try connecting anyway, or whether he or she wants to try later when the agent's presence status indicates that he is available. If the customer indicates that he or she wants to try later, the application may be configured to monitor the identified agent's presence information, and once the agent is indicated to be present, automatically launch the interaction with the identified agent. Of course, a prompt may be displayed to the customer to confirm that the interaction is still desired. For example, the prompt may say, "Agent X is now available, please click to connect." Prior to sending the prompt, the contact center system may reserve the agent for a configurable short time (e.g. 5 seconds) to allow the customer to react. If that agent is desired by more than one customer, the first customer who reacts (e.g. clicks to connect) gets the connection to the agent. Once the connection is established, a negative alert may be sent by the contact center system to the other customers indicating that the agent is no longer available, and asking if they want to be notified again. According to one embodiment, the customers who originally got the positive alert of the agent availability get the negative alert if the connection cannot be established for those customers despite their clicking to connect.

If the call is to proceed despite the agent being unavailable, the client iXn controller 16 transmits an agent reservation request in act 306 to the CC iXn controller 18 to reserve the selected agent or agent group. According to one embodiment, the request is transmitted to the CC iXn controller 18 over the data channel prior to or concurrently with the transmitting of call data. According to one embodiment, the reservation request is received at a central place at the contact center where logic for agent reservation resides, such as, for example, at a CC telephony server 240. If the reservation request identifies an agent group or a list with various possible agents, the CC telephony server 240 may be configured to select (e.g. randomly) one of the various agents of the group or list for reservation.

Once an agent is reserved for the particular interaction, the agent is blocked for any other interactions for a particular period of time (e.g. 15 seconds). For example, the agent may be identified by the statistics server 108 as being in a busy/unavailable state. It is possible that multiple agent reservation requests for the same agent may be concurrently received from multiple routing servers (e.g. client routers 200 or CC routing servers 105). In this case, priority data associated with the requests may be used for determining to whom to assign the agent. Priority determinations may be made based on, for example, customer segmentation information about the customer associated with the interaction. According to this example, requests relating to "Gold" customers may be given higher priority than requests relating to "Bronze" customers.

In act 308, a determination is made as to whether the agent reservation was successful. If the answer is NO, another agent reservation request is transmitted to either the same agent or agent group, or to a new agent or agent group. In this regard, the routing logic at the client router 200 determines whether to retry the same agent/agent group, or select a next preferred agent or agent group. Identification of the next preferred agent or agent group may be pre-configured by the customer. The customer may also manually select a different agent or agent group in response to indication of the unsuccessful agent reservation request. Of course, instead of the agent selecting a specific agent, freedom may be given to the enterprise to select an available agent as would be done according to conventional routing mechanisms.

If an agent was successfully reserved, the client iXn controller 16, in act 310, transmits a call control message to the CC iXn controller 18 over the data channel. According to one embodiment, the telephony server 240 coupled to the switch/media gateway 100 that receives the voice call via the voice channel, receives the call control message via the data channel. The call control message may contain, for example, data about the interaction, customer, and/or reserved agent. According to one embodiment, the client iXn controller 16 further provides a dialer application for launching the actual voice call towards the contact center. In this regard, the dialer application functions as a switch for the end user device.

Once launched, the voice call lands on the switch/media gateway 100 at the contact center until routed to an appropriate destination. As described in further detail in FIG. 8, when the call arrives at the switch/media gateway 100, the CC telephony server 240 determines a routing point (also referred to as an external route point) to which the call should be transferred based on the received interaction data. According to one embodiment, the identified routing point is a personal routing point that is enabled for CCIM.

In act 312, the client iXn controller 16 (e.g. client telephony server 280) receives a call transfer message from the CC iXn controller 18 that identifies the transfer routing point, along with any interaction data collected by the CC iXn controller. By forwarding the collected interaction data from the CC iXn controller 18 to the client iXn controller 16, data, such as identification of the reserved agent, is preserved.

According to one embodiment, the transfer routing point is associated with the client telephony server 280 hosted by the client iXn controller 16. The call transfer message is received by the client telephony server 280 over the data channel. The actual call is also received by the dialer application that acts as the switch for the end user device. In response to the call arriving at the dialer application, the client telephony server 280 informs the client router 200 of the call.

In act 316, the client router proceeds to route the call according to its routing logic. In this regard, the routing logic may be configured to identify the preferred agent that has been reserved for the interaction (e.g. based on the received interaction data), and proceed to route the call to the reserved agent. The routing logic may optionally check whether the reserved agent is indeed still available. In routing the call, the client router 200 invokes the dialer application to call the access (directory) number of the reserved agent. The access number may be provided in the call transfer message from the CC iXn controller transmitted in act 310. A voice connection is then made with the customer and the reserved agent.

FIG. 8 is a flow diagram of a process executed by the CC iXn controller 18 to allow CCIM for a customer according to one embodiment of the invention, According to one embodiment, the process starts, and the CC iXn controller receives, in act 400, the call control message containing interaction data from the client iXn controller 16 over the data channel.

In act 402, the CC telephony server 240 identifies an external route point based on the received interaction data. For example, the CC telephony server 240 may identify the caller number in the interaction data as one that is enabled for CCIM. A personal route point is thus identified and reserved for routing the call. The interaction data received from the client iXn controller is then saved in association with the personal route point. According to one embodiment, the personal route point is associated with a directory number of the dialer application hosted by the client iXn controller 16.

In act 404, the actual voice call launched by the end user device is received at the switch/media gateway 100, and the call is matched to the data saved in association with the personal route point.

In act 406, the CC telephony server 240 transfers the call to the personal route point. The transfer of the call further causes transfer of the interaction data to the client telephony server 280. According to one embodiment, transfer of the call to the client telephony server relinquishes control of the call by the contact center. Thus, further routing of the call to the reserved agent is performed based on routing logic controlled by the customer instead of routing logic under the control of the contact center.

Although routing is used herein as a main example of interaction processing by the customer, a person of skill in the art should recognize that the customer may be in control of other aspects of interaction processing, such as, for example, obtaining interaction history data, checking status of interactions, and the like. Also, although the examples of customer controlled interactions provided herein relate to inbound real-time interactions initiated by the customer (e.g. voice calls, chat, directly routed emails, etc.), a person of skill in the art should recognize that deferrable interactions could also be controlled by the customer, such as, for example, emails that are placed in the agent's workbin for handling as time permits. Outbound interactions initiated by the contact center may also be controlled by the customer, such as, for example, by enabling the customer to control the customer's entries in calling lists by removing the customers number, changing the time of the outbound contact, selecting a telephone number, assigning the outbound interaction to certain agents, and the like.

In addition to embodiments where control of the interaction is by the customer, a hybrid solution is also contemplated where certain parts of the interaction processing are controlled by the customer, and other parts are controlled by the business. For example, certain internal processes for claim approval will stay under business control while the customer may control the claim adjuster who ultimately handles the claim.

In another embodiment, a "soft" CCIM may be provided to a customer where the customer merely expresses interaction intent and preferred agent(s), but the actual final assignment of the interaction to an agent is done by the business that tries to accommodate the customer's preference.

Social Media Integrated Agent Routing

According to one embodiment, a customer may share personal ranking, recommendation, and/or satisfaction information (collectively referred to as "rating") about agents, services, and/or products, with other users. The agent ratings may be indicative of qualifications of the agents, customer satisfaction provided by the agents, and/or the like. According to one embodiment, the VMR module 20 may be invoked to collect and share the rating information on social media sites such as Facebook and Twitter. The information may also be shared on rating websites such as Yelp. According to one embodiment, the CCIM application provides a graphical user interface to prompt a user to rate an agent (e.g. after an interaction with such agent).

According to one embodiment, the client CC iXn controller 16 and/or VRM module 20 may be configured to automatically monitor websites on the Internet for ratings of agents of a particular contact center that are posted by other customers. For example, ratings may be obtained for all agents listed in the customer's preferred agent list, and an average of such ratings may be displayed by the CCIM application along with any personal rating provided by the customer. The collected ratings for an agent may be used to propose the agent to a preferred status, or demote the agent to a less preferred status. The rating information may also be used to select an agent to whom to route an interaction enabled for CCIM, if no manual selection was made by the customer.

According to one embodiment, the exposing of agent rating information in addition to agent presence information allows the customer to have a more complete set of data for deciding when and with which agent to have a CCIM enabled interaction. For example, if a first agent with a low rating is identified as being available for a voice interaction, but a second agent with a higher rating is identified as being busy for such voice interaction, the customer may want to wait until agent two becomes available prior to initiating the call.

Figure 9A:
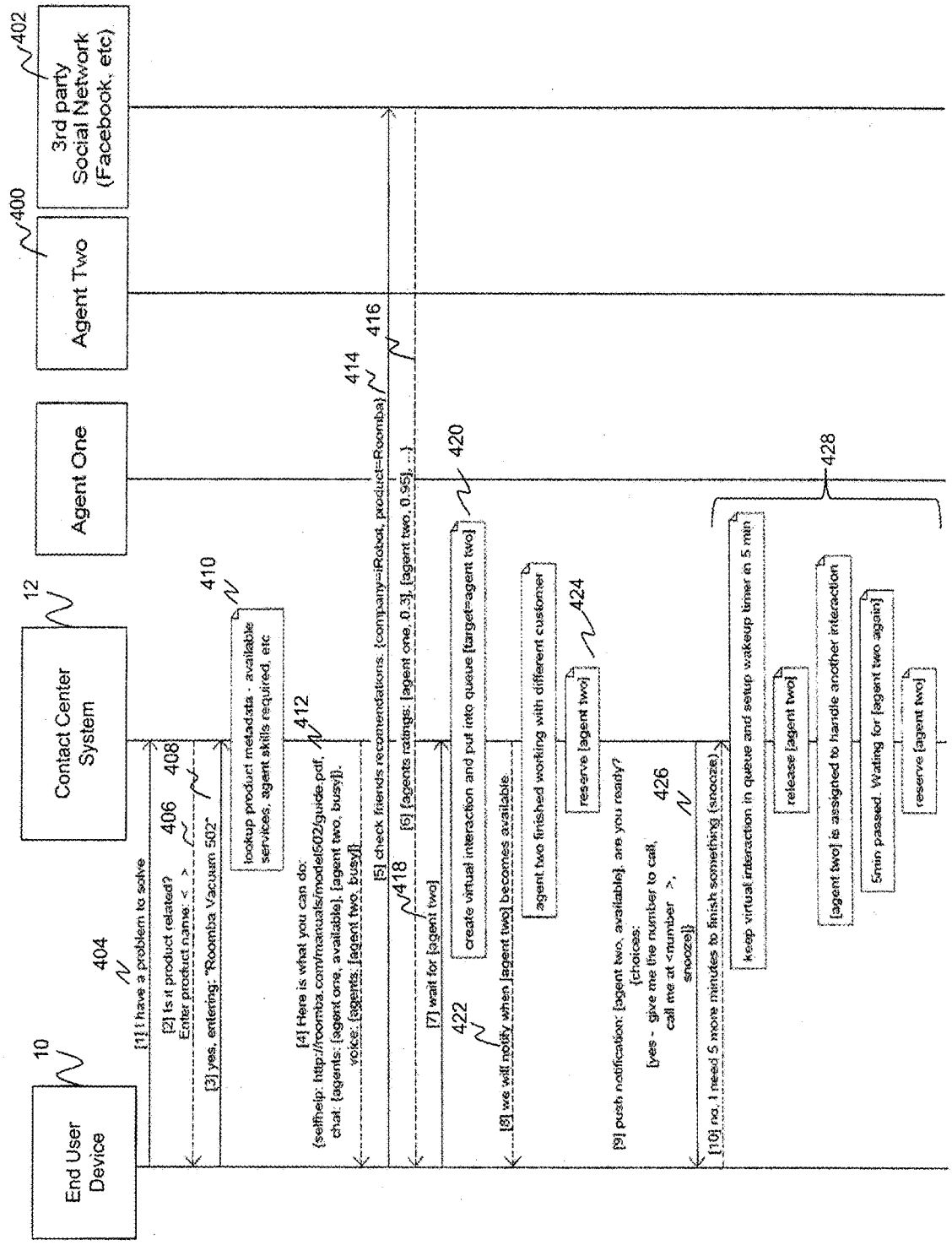
FIGS. 9A-9B are exemplary signaling diagrams of messages exchanged between an end user and the contact center system in a non-CCIM enabled interaction according to one embodiment of the invention.
Figure 9B:
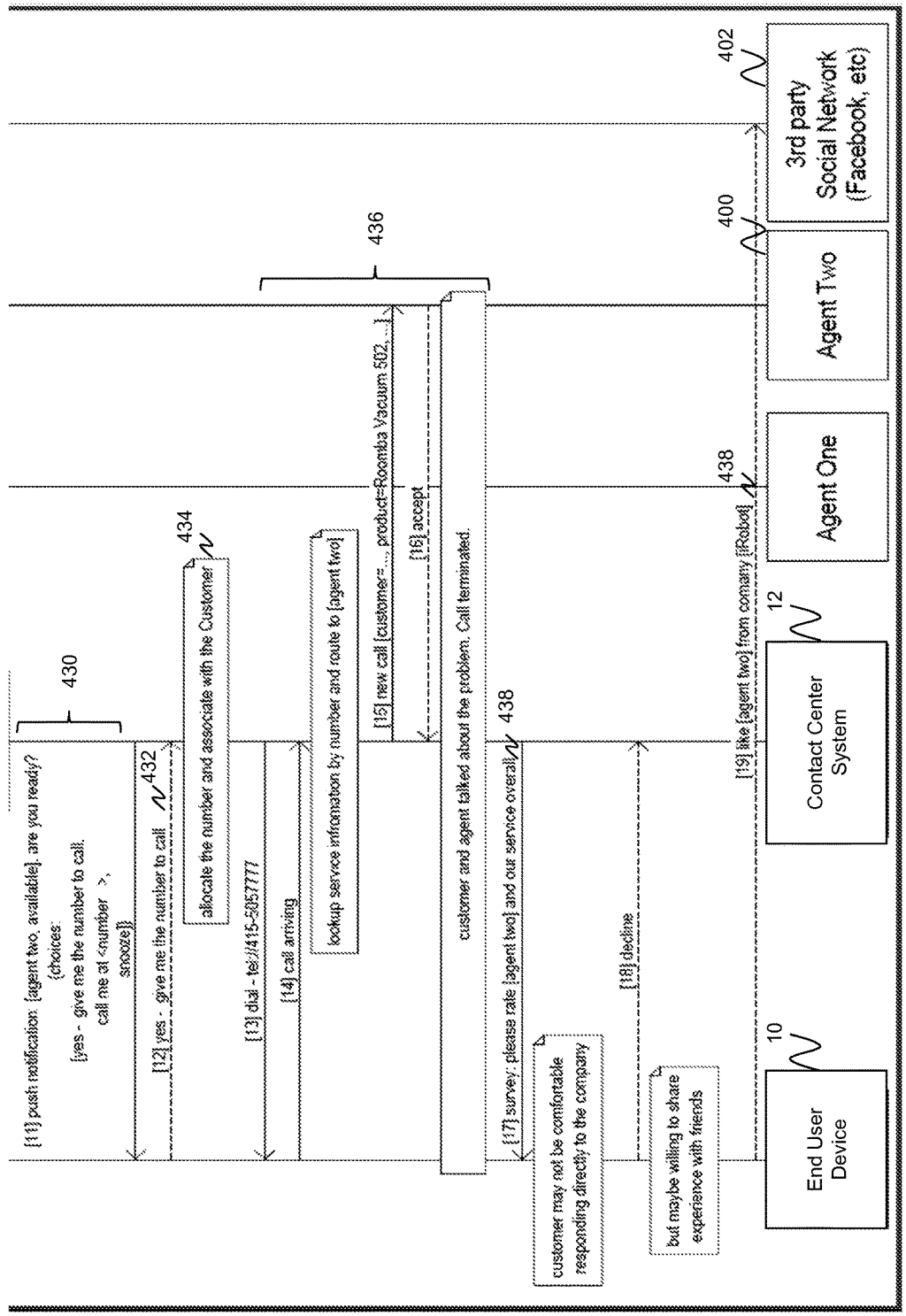

Agent rating and presence information may also be used for non-CCIM enabled interactions. FIGS. 9A-9B are exemplary signaling diagrams of messages exchanged between an end user and the contact center system in a non-CCIM enabled interaction according to one embodiment of the invention. According to the embodiment of FIGS. 9A-9B, the end user device 10 may host an application that allows interaction with the contact center system 12 to gather information about agents, products, and services of the contact center.

In act 404, the end user device 10 invokes the application and submits a message to the contact center system 12 indicating that the customer has a problem that needs to be solved. For example, the customer may select an "I have a problem" button displayed by the application.

In act 406, the contact center system (e.g. multimedia/social media server 116) receives the data, and in response, transmits a second message to the application for gathering information on the cause of the problem. For example, the customer may be prompted to enter the name of the product to which the problem is related. In another embodiment, the history of interactions with the application may provide clue as to the product or service that is causing problems for the customer.

In act 408, the application transmits details on the problem, such as, for example, the product name. In the example of FIGS. 9A-9B, the customer identifies that the problem is product related, and the product name is "Vacuum 502."

In response to identifying the product causing problems, the contact center system may be configured, in act 410, to retrieve product metadata including, for example, available services relating to the product, agent skills required to deal with issues with the product, and the like. Such information may be retrieved, for example, from the mass storage device 100 located at the contact center system 12.

Based on the retrieved product metadata, suggestions are provided to the customer, in act 412 as to how to resolve the issue. The options may include self-help options as well as interaction options with live agents that have been identified as having skills for handling the interaction. According to one embodiment, the contact center system 12 exposes agent presence information to the application for each type of interaction channel. In the example of FIGS. 9A-9B, agent 1 and agent 2 have skills to have a chat about the identified product/issue, while agent 2 has skills to conduct a voice conversation about the identified product/issue. Agent 1 is identified as being available for chat, while agent 2 is busy. Agent 2 is identified as being busy for voice interactions.

According to one embodiment, in response to identification of agents with skills for handling the particular issue, the application at the end user device 10 may be configured to search, in act 414, one or more social networks for ratings by other people on the product and/or agents identified by the contact center system 12. For example, the application may be configured to go inquire social networks like Facebook to see is any of the customer's friends have provided a rating for the product or agents (e.g. a total number of "likes" or "dislikes" for a particular agent). If such information is available, the agent rating information is returned to the application in act 416 for display to the customer. Embodiments of the present invention thus provide the customer full information as to agent availability as well as agent ratings for helping the customer decide how he wants to interact with the contact center.

According to one embodiment, the customer may configure the application to automatically select the agent with the highest rating if the agent is available. If the highest rated agent is not available, the application may be configured to prompt the customer to indicate how he would like to proceed. For example, the customer may want to proceed with a lower rated agent that is currently available, wait for the higher rated agent, or the like.

In the example of FIG. 9, the end user device 10 transmits, in act 418, a message to the contact center system 12 indicating that the customer will wait for agent 2. In response, the contact center system (e.g. call server 102) creates a virtual interaction in act 420 where the target of the interaction is set to agent 2. The contact center system 12 further transmits a message, in act 422, that the customer will be notified when agent 2 becomes available.

When agent 2 does become available, the contact center system 12 reserves agent 2 in act 424 and pushes notification to the customer in act 426 as to this fact. The customer is also provided information on the choices that he can take, such as receiving the number of agent 2, requesting that agent 2 call the customer at his number, or requesting additional time before engaging in the interaction with agent 2.

If the customer needs additional time, the contact center system releases agent 2, re-reserves him, and inquires the customer as to whether he wants to engage in the interaction (collectively referenced as acts 428 and 430), until the customer indicates, in act 432, that he wants the access telephone number of agent 2 to initiate the interaction. In response, the contact center system 12 allocates the number and associates it to the customer.

In acts referred generally as 436, the customer dials the telephone number for agent 2, and the contact center system 12 matches the incoming call to the stored customer data and routes the call to an agent device for agent 2 400.

Once the call between the customer and the agent terminates, the contact center system 12 may transmit a survey to get feedback on the experience. The customer may respond or decline the survey. Even if the customer declines, he or she may be willing to share his experience with his friends. In this regard, the application or VRM module 20 may provide a graphical user interface to allow the customer to capture information about the experience. Such information may include, for example, a rating given to the agent based on the experience. The information is stored in the customer's mass storage device 22 but may be exposed, in act 438, to one or more businesses, social media networks, and the like, based on settings configured by the customer. For example, the VRM module 20 may access APIs exposed by various social networks to automatically post the experience information on those networks.

Although the interaction in FIGS. 9A-9B are described as non-CCIM enabled interaction, a person of skill in the art should recognize that the interaction may also be a CCIM enabled interaction where the routing logic that is executed to route the interaction is controlled by the customer instead of the contact center. In this regard, when the ratings of the first and second agents are received in act 416, the CCIM application may be configured to, either automatically or in response to a user command, request an interaction specifying the higher rated agent, employing a process similar to the process described with respect to FIGS. 7 and 8.

Each of the various servers, controllers, switches, gateways, engines, and/or modules (collectively referred to as servers) in the afore-described figures may be a process or thread, running on one or more processors, in one or more computing devices 1500 (e.g., FIG. 10A, FIG. 10B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 10A:
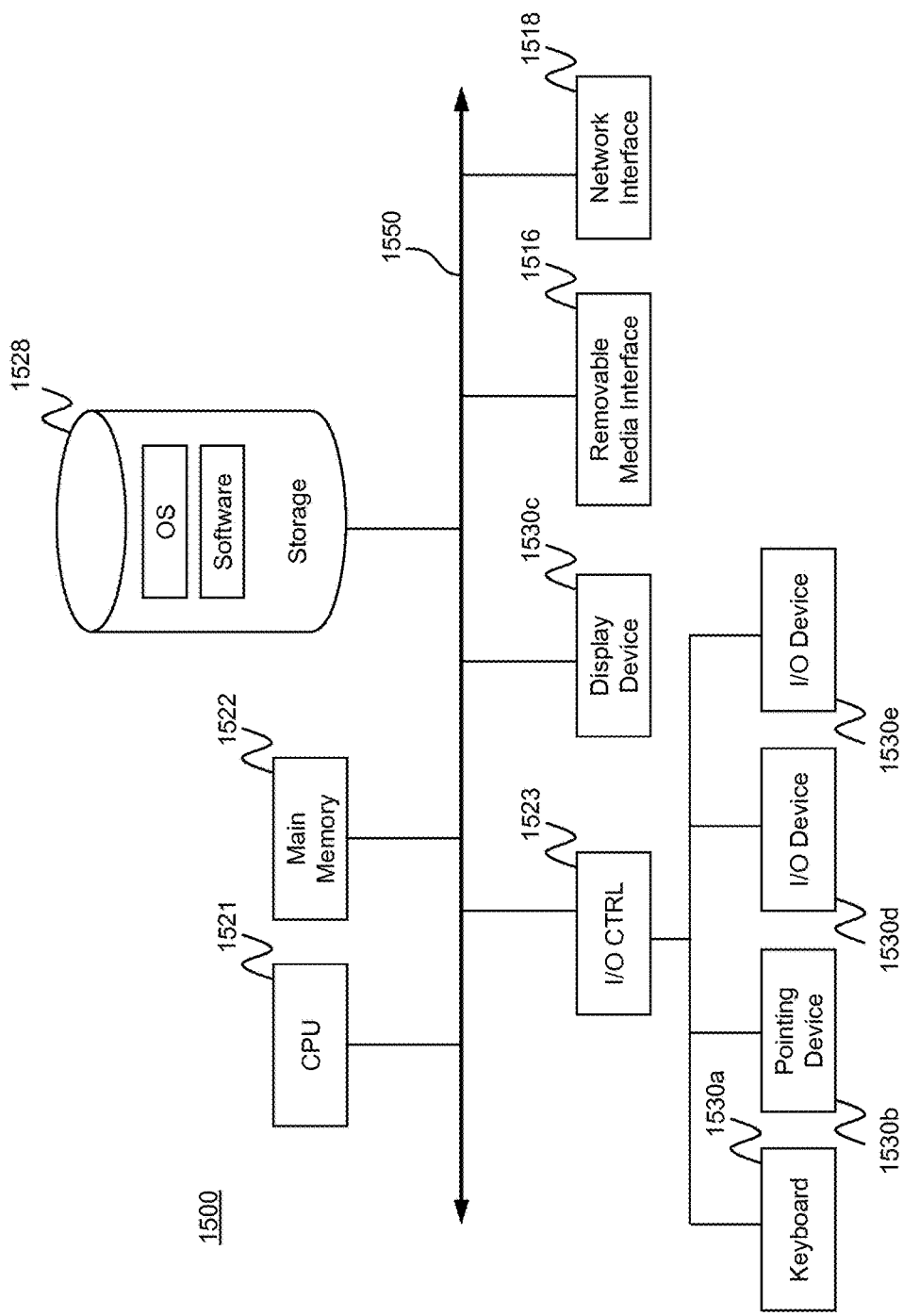
FIG. 10A is a block diagram of a computing device according to an embodiment of the present invention.
Figure 10B:
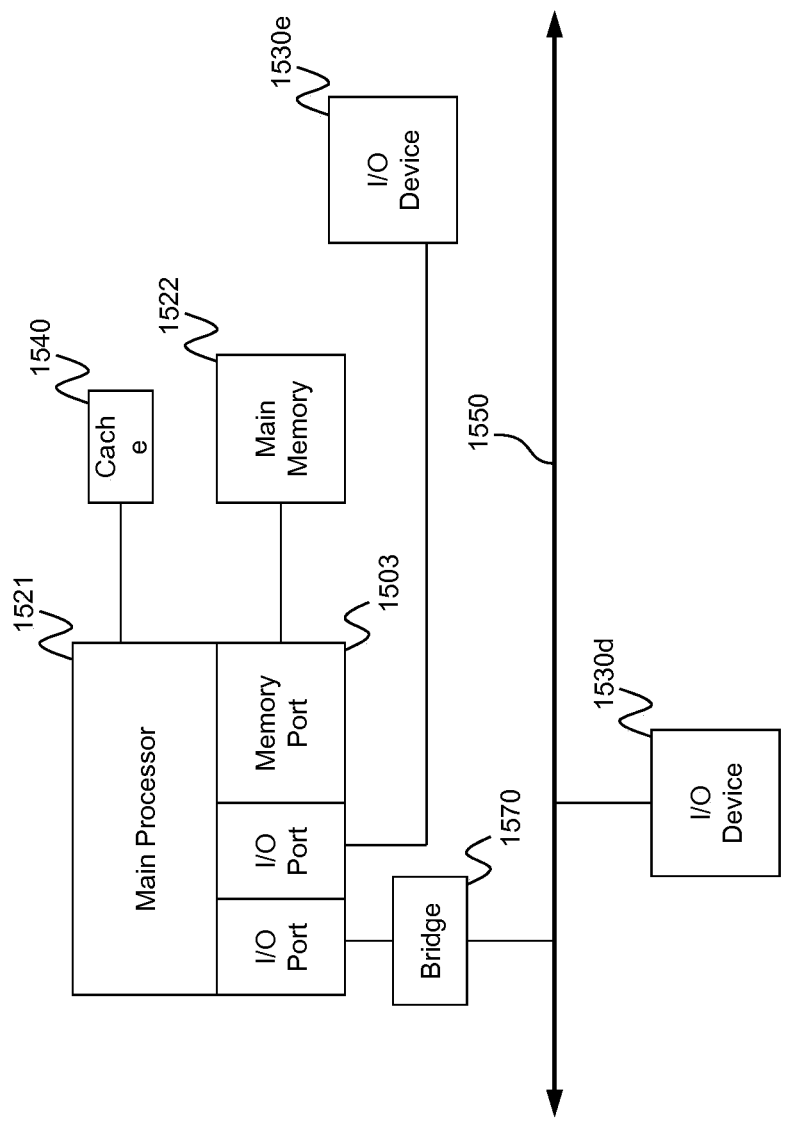
FIG. 10B is a block diagram of a computing device according to an embodiment of the present invention.

FIG. 10A and FIG. 10B depict block diagrams of a computing device 1500 as may be employed in exemplary embodiments of the present invention. Each computing device 1500 includes a central processing unit 1521 and a main memory unit 1522. As shown in FIG. 10A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 10B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 10A, the central processing unit 1521 communicates with the main memory 1522 via a system bus 1550. As shown in FIG. 10B, the central processing unit 1521 may also communicate directly with the main memory 1522 via a memory port 1503.

FIG. 10B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 10A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 10B depicts an embodiment of a computer 1500 in which the central processing unit 1521 communicates directly with I/O device 1530e. FIG. 10B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 10A, may control the I/O devices. The I/O controller may control one or more I/O devices such as a keyboard 1530a and a pointing device 1530b, e.g., a mouse or optical pen.

Referring again to FIG. 10A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 10A and FIG. 10B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 10C:
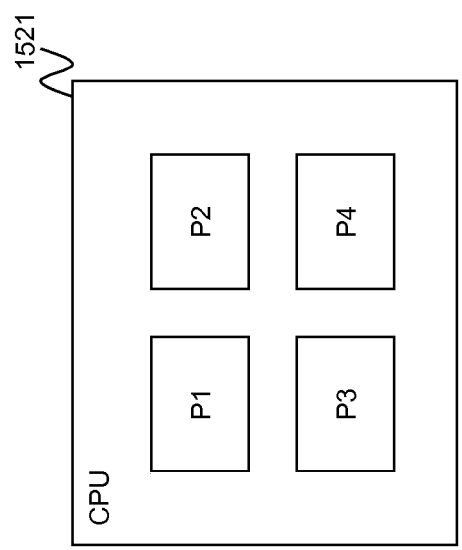
FIG. 10C is a block diagram of a computing device according to an embodiment of the present invention.
Figure 10D:
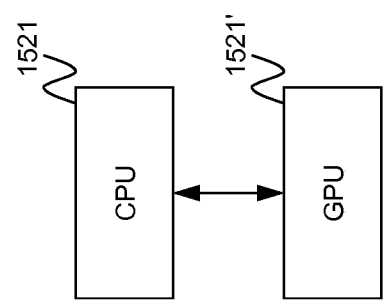
FIG. 10D is a block diagram of a computing device according to an embodiment of the present invention.

As shown in FIG. 10C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 10D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 10E:
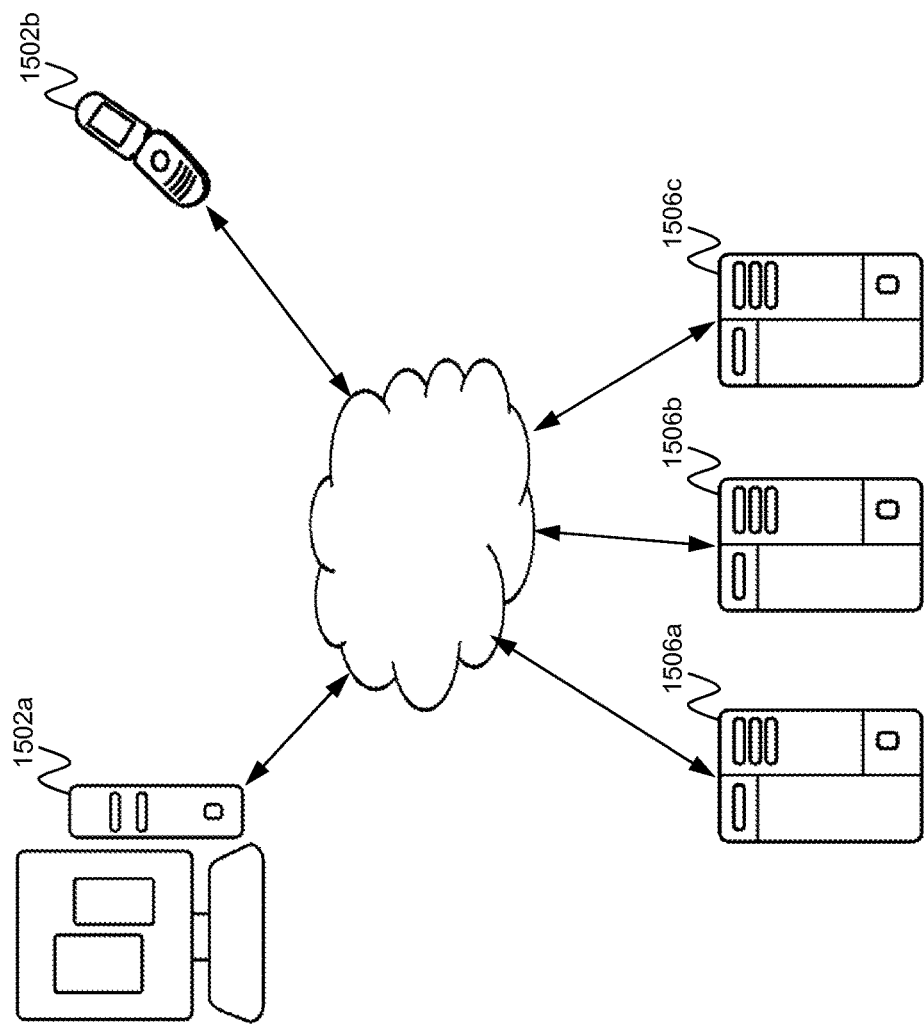
FIG. 10E is a block diagram of a network environment including several computing devices according to an embodiment of the present invention.

A computing device may be one of a plurality of machines connected by a network, or it may comprise a plurality of machines so connected. FIG. 10E shows an exemplary network environment. The network environment comprises one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 10E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 10E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

It is the Applicant's intention to cover by claims all such uses of the invention and those changes and modifications which could be made to the embodiments of the invention herein chosen for the purpose of disclosure without departing from the spirit and scope of the invention. The particular manner in which template details are presented to the user may also differ. Thus, the present embodiments of the invention should be considered in all respects as illustrative and not restrictive, the scope of the invention to be indicated by claims and their equivalents rather than the foregoing description.

The invention claimed is:

1. A system for managing interactions of a customer contact center, the system comprising:
 a processor; and
 a memory, wherein the memory has stored therein instructions that, when executed by the processor, cause the processor to:
 receive data about an interaction;
 identify a routing point for routing the interaction based on the received data, wherein the routing point is associated with routing logic that includes routing instructions adapted to be generated in response to one or more commands from a customer; and
 route the interaction to the identified routing point for giving the customer control of the routing of the interaction, wherein in response to routing the interaction to the identified routing point, the routing instructions are invoked for routing the interaction to a contact center resource according to the routing logic.

2. The system of claim 1, wherein the interaction is a telephony interaction, the system further comprising:
 a switch coupled to the processor for establishing a voice path between an end user device and a device of the contact center resource.

3. The system of claim 1, wherein the received data includes a caller identifier.

4. The system of claim 1, wherein the instructions further cause the processor to:
 transmit a software application to a customer end user device over a communications network, wherein the software application includes instructions for executing the routing logic.

5. The system of claim 4, wherein the software application includes instructions for monitoring presence of the contact center resource.

6. The system of claim 5, wherein the software application includes instructions for receiving presence information from a contact center server.

7. The system of claim 4, wherein the software application is transmitted to the customer end user device in response to identifying the customer as belonging to a particular customer segment.

8. The system of claim 4, wherein the interaction is a telephony interaction, and the software application includes instructions for invoking a dialer for initiating the telephony interaction.

9. The system of claim 4, wherein the software application provides an interface for prompting the customer to configure the routing logic.

10. The system of claim 4, wherein the software application provides an interface for prompting the customer to identify one or more preferred contact center agents.

11. The system of claim 4, wherein the software application provides an interface for prompting the customer to provide a rating for the interaction.

12. The system of claim 11, wherein the software application is configured to share the rating with other customers.

13. The system of claim 1, wherein the routing point is identified by a telephone number.

14. A method for managing interactions of a customer contact center, the method comprising:
receiving, by a processor, data about the interaction;
identifying, by the processor, a routing point for routing the interaction based on the received data, wherein the routing point is associated with routing logic that includes routing instructions adapted to be generated in response to one or more commands from a customer; and
routing the interaction to the identified routing point for giving the customer control of the routing of the interaction, wherein in response to routing the interaction to the identified routing point, the routing instructions are invoked for routing the interaction to a contact center resource according to the routing logic.

15. The method of claim 14, wherein the interaction is a telephony interaction, and the method further includes:
establishing a voice path between an end user device and a device of the contact center resource via a switch.

16. The method of claim 14, wherein the received data includes a caller identifier.

17. The method of claim 14 further comprising:
transmitting a software application to a customer end user device over a communications network, wherein the software application includes instructions for executing the routing logic.

18. The method of claim 17, wherein the software application monitors presence of the contact center resource.

19. The method of claim 18, wherein the software application receives presence information from a contact center server.

20. The method of claim 17, wherein the software application is transmitted to the customer end user device in response to identifying the customer as belonging to a particular customer segment.

* * * * *